US010936468B1

(12) United States Patent
Ochlak (10) Patent No.: US 10,936,468 B1
(45) Date of Patent: Mar. 2, 2021

(54) SYSTEM AND METHOD OF AUTOMATIC SOFTWARE RELEASE TERMINATION BASED ON CUSTOMIZED REPORTING STATIC CODE ANALYSIS

(71) Applicant: BOOMI, INC., Round Rock, TX (US)

(72) Inventor: Eric M. Ochlak, West Chester, PA (US)

(73) Assignee: BOOMI, INC., Round Rock, TX (US)

( * ) Notice: Subject to any disclaimer, the term of this patent is extended or adjusted under 35 U.S.C. 154(b) by 0 days.

(21) Appl. No.: 16/864,680

(22) Filed: May 1, 2020

(51) Int. Cl.
*G06F 9/44* (2018.01)
*G06F 11/36* (2006.01)
*G06F 8/41* (2018.01)
*G06F 8/60* (2018.01)

(52) U.S. Cl.
CPC ............ *G06F 11/3608* (2013.01); *G06F 8/43* (2013.01); *G06F 8/60* (2013.01); *G06F 11/3616* (2013.01)

(58) Field of Classification Search
None
See application file for complete search history.

(56) References Cited

U.S. PATENT DOCUMENTS

| 8,510,717 | B2 | 8/2013 | Georgieva | |
|---|---|---|---|---|
| 8,850,574 | B1 * | 9/2014 | Ansel | G06F 21/53 717/141 |
| 9,262,134 | B2 | 2/2016 | Kelapure | |
| 10,831,898 | B1 * | 11/2020 | Wagner | G06F 9/547 |
| 2009/0193397 | A1 * | 7/2009 | Chithambaram | G06F 8/35 717/128 |
| 2010/0042974 | A1 * | 2/2010 | Gutz | G06F 8/71 717/121 |
| 2011/0078667 | A1 | 3/2011 | Dolby | |
| 2011/0296388 | A1 * | 12/2011 | Rohde | G06F 8/433 717/131 |
| 2013/0097582 | A1 * | 4/2013 | Chandra | G06F 8/24 717/105 |
| 2016/0124724 | A1 | 5/2016 | Gautam | |
| 2017/0212829 | A1 | 7/2017 | Bales | |
| 2018/0032735 | A1 * | 2/2018 | Sheth | G06F 21/562 |

* cited by examiner

*Primary Examiner* — Qamrun Nahar
(74) *Attorney, Agent, or Firm* — Prol Intellectual Property Law, PLLC; H. Kenneth Prol (57) ABSTRACT

A method of enforcing a deployment static code analysis may comprise receiving human-readable code instructions for a customized software application, compiling the human-readable code instructions into machine-executable code instructions, and performing a customized reporting static code analysis of the machine-executable code instructions to identify a critical code error resulting from violation of a pre-set customized rule associated with a pre-defined terminal risk, via a processor. The method may further comprise receiving an instruction, via a network interface device, from a customer, to release the machine-executable code instructions for the customized software application, automatically terminating release of the machine-executable code instructions via the processor, and transmitting a notification to the customer identifying the pre-defined terminal risk, via the network interface device.

20 Claims, 4 Drawing Sheets

SYSTEM AND METHOD OF AUTOMATIC SOFTWARE RELEASE TERMINATION BASED ON CUSTOMIZED REPORTING STATIC CODE ANALYSIS

FIELD OF THE DISCLOSURE

The present disclosure relates generally to a system and method for auditing and deploying a custom-built software application. More specifically, the present disclosure relates to customized reporting for auditing and automatic termination of release procedures for applications failing to meet customized reporting for auditing standards.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), a head-mounted display device, server (e.g., blade server or rack server), a network storage device, a network storage device, a switch router or other network communication device, other consumer electronic devices, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components. Further, the information handling system may include telecommunication, network communication, and video communication capabilities and require communication among a variety of data formats. Software systems for plural format data communications and integrations may be developed via one or more information handling systems.

BRIEF DESCRIPTION OF THE DRAWINGS

The present disclosure will now be described by way of example with reference to the following drawings in which.

The use of the same reference symbols in different drawings may indicate similar or identical items.

DETAILED DESCRIPTION

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Recently, systems and software applications have been established to provide a system and method for on-demand creation and maintenance of customized software applications in which the building, testing, and release of the customized software application occurs outside of an enterprise's computing network. Integration Platform as a Service (iPaaS) tools using a set of operating principles referred to herein as continuous integration and continuous deployment or delivery (CI/CD) may enable application development teams to deliver code changes used to maintain such customized software applications more frequently and reliably. Setting these operating principles prior to creation and maintenance of customized software applications may partially or wholly automate deployment processes, allowing software development teams to focus on meeting business, code quality, and security requirements. Such principles may include continuous and frequent, small changes to machine executable code instructions for a customized software application, as well as employing consistent and automated mechanisms to build, package, test, and deploy the customized software application itself and these changes used in maintenance of the application. The Dell Boomi® AtomSphere® Platform is an example of such a CI/CD compliant iPaaS. With Dell Boomi® and other similar applications, software developers in Dell Boomi® customers' employ may build, test or audit, and deploy customized software applications (e.g., Java® Software applications such as Dell Boomi® Atomsphere Platform) or application programming interfaces (APIs), which third parties (e.g., customers of the Dell Boomi® customers) may then access or execute.

The CI/CD process may include several phases, including building, testing, packaging, and deployment. The build process may involve the use of a CI/CD development modified build tool or application build module that at least partially automates the compiling of human-readable code instructions supplied by a Dell Boomi® employee or customer into machine-executable code instructions or changes to existing code instructions for a software application in embodiments described herein. Such build tools may include open source build tools for specific code languages, in some embodiments. For example, the Dell Boomi® CI/CD system in embodiments described herein may include an application build module operating CI/CD development modified open source code instructions drawn from the Apache® Maven™ Project for the Java® language. These CI/CD development modified open source code instructions, executed within the Boomi® CI/CD system may be used to build, clean, and automate release for customized software applications in embodiments described herein.

The Boomi® CI/CD system in embodiments may also employ additional CI/CD development modified Maven™-compliant, open source plug-ins, to provide additional functionalities. For example, Static Code Analysis (SCA) tools that operate to identify vulnerabilities in machine-executable code instructions for customized software applications, prior to their execution, may be used in conjunction with the CI/CD development modified Maven™-compliant build module to prepare the customized software application for deployment. SCA tools may develop specific software metrics or perform a software audit of the machine-executable code instructions compiled by the application build module. Such software audits operate to identify vulnerabilities in code instructions, such as, for example, the use of poor programming language techniques (e.g., non-bounds-checking functions that could lead to a buffer overflow, pointer manipulation of buffers that may interfere with later bounds checking, circular input validation, cross-site scripting, and directory traversal), reliance on incorrect or expired object dependencies, or incorrect coding syntax. SCA tools may also operate in tandem with open source, Maven™-compliant build tools to notify software developers if the audit logs indicate critical code errors, prior to release of the application for execution. Software developers using such open source, Maven™-compliant build tools may then manually determine whether to release the customized software application, despite the recorded errors, or to terminate the deployment process. However, such SCA systems does not allow for automatic termination of the release or deployment process, which is a critical aspect of the CI/CD process enabled by the Boomi® CI/CD system. A system is needed that can identify critical code errors to trigger execution of such an automatic termination.

The deployment static code analysis enforcement system in embodiments of the present disclosure provide such functionality by performing more in-depth auditing or testing of the machine-executable code instructions for the customized software application (e.g., customized reporting static code analysis), and automatically terminating deployment or release if certain critical code errors are detected in such in-depth audit reports. This additional or enhanced information reflects more in-depth static code analysis than that provided by existing SCA tools, and may indicate a likelihood of generating a critical code error not identified by existing SCA tools. In embodiments described herein, this additional auditing information is leveraged to automatically inhibit deployment of code instructions that exhibit these critical code errors identified by the customized reporting for auditing of embodiments of the present disclosure, but not by existing SCA tools. In such a way, the deployment static code analysis enforcement system in embodiments described herein may achieve the goals of CI/CD to deliver code changes used to maintain customized software applications more frequently and reliably.

Figure 1:
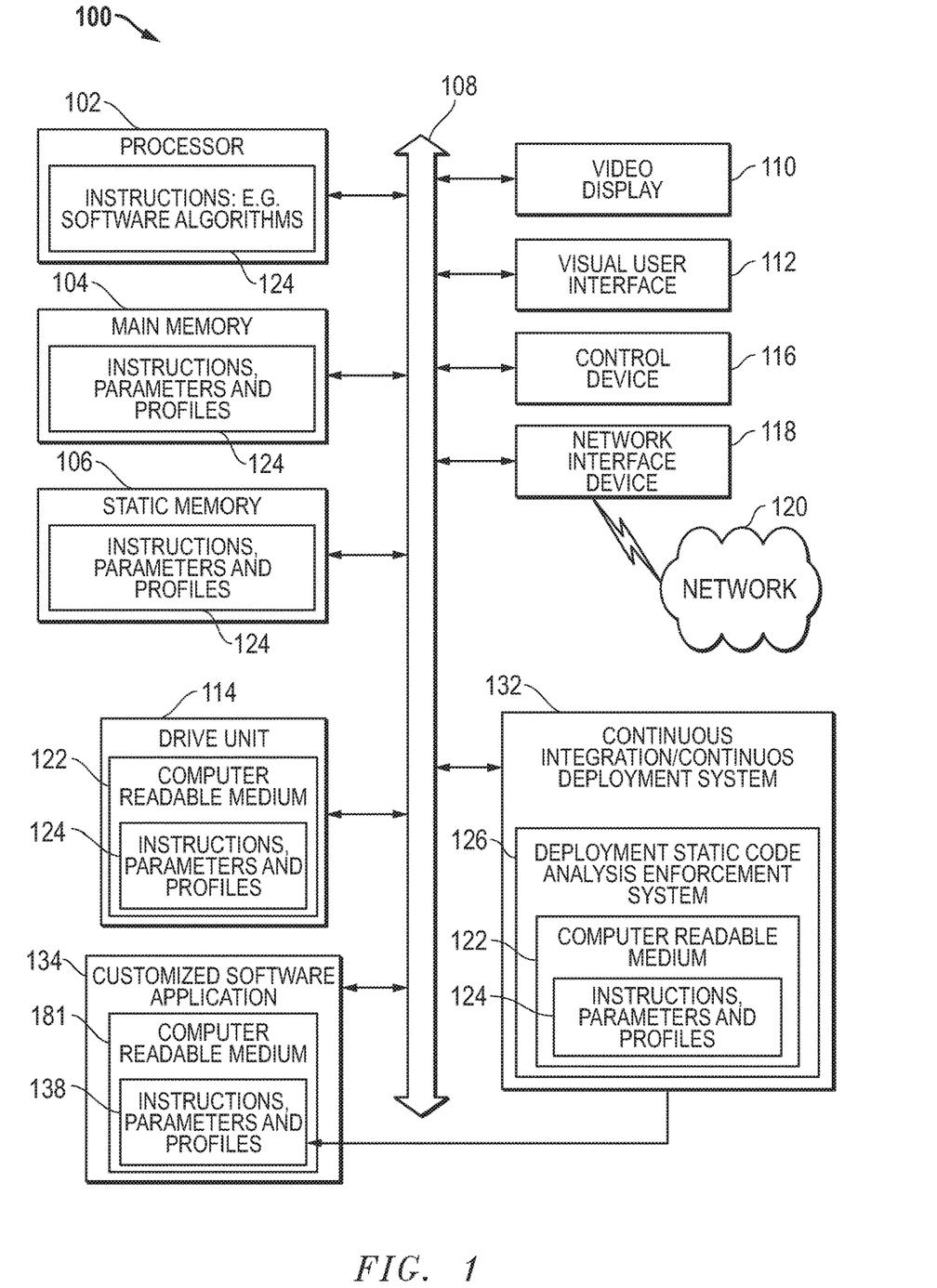
FIG. 1 is a block diagram illustrating an information handling system according to an embodiment of the present disclosure.

FIG. 1 is a block diagram illustrating an information handling system, according to an embodiment of the present disclosure. Information handling system 100 can include processing resources for executing machine-executable code, such as a central processing unit (CPU), a programmable logic array (PLA), an embedded device such as a System-on-a-Chip (SoC), or other control logic hardware used in an information handling system several examples of which are described herein. Information handling system 100 can also include one or more computer-readable media for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

FIG. 1 illustrates an information handling system 100 similar to information handling systems according to several aspects of the present disclosure. For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include devices or modules that embody one or more of the devices or execute instructions for the one or more systems and modules herein, and operates to perform one or more of the methods. The information handling system 100 may execute code 124 for the continuous integration/continuous deployment (CI/CD) system 132, or the deployment static code analysis enforcement system 126 that may operate on servers or systems, remote data centers, or on-box in individual client information handling systems such as a local display device, or a remote display device, according to various embodiments herein. The information handling system 100 may also execute code 138 for a customized software application 134 built, tested, and deployed using the CI/CD system 132. The code instructions 138, or portions thereof, may also operate on servers or systems, remote data centers, or on-box in individual client information handling systems such as a local display device, or a remote display device, according to various embodiments herein. In some embodiments, it is understood any or all portions of code 124 for the CI/CD system 132, or the deployment static code analysis enforcement system 126 may operate on a plurality of information handling systems 100. In some embodiments, the CI/CD system 132 may operate on an information handling system 100 that is physically separate from the information handling system operating the customized software application 134. The CI/CD system 132 in an embodiment may generate and update the underlying instructions, parameters, and profiles 138 that operate the customized software application 134, by transmitting the code instructions 138 to the customized software application 134 directly or via the bus 108, or by transmitting the code instructions 138 to a remote execution platform (not shown) for the custom software application 134 via the network 120. Thus, new or updated code instructions 138 may be transmitted by the CI/CD system 132 to an execution platform (not shown), or the information handling system 100 for the custom software application 134 in a wired or in a wireless communication network.

The information handling system 100 may include a processor 102 such as a central processing unit (CPU), a graphics-processing unit (GPU), control logic or some combination of the same. Any of the processing resources may operate to execute code that is either firmware or software code. Moreover, the information handling system 100 can include memory such as main memory 104, static memory 106, drive unit 114, or the computer readable medium 122 of the CI/CD system 132, or the deployment static code analysis enforcement system 126 (volatile (e.g. random-access memory, etc.), nonvolatile (read-only memory, flash memory etc.) or any combination thereof). Additional components of the information handling system can include one or more storage devices such as static memory 106, drive unit 114, and the computer readable medium 122 of the CI/CD system 132, or the deployment static code analysis enforcement system 126. The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110, such as a liquid crystal display (LCD), an organic light emitting diode (OLED), a flat panel display, a solid state display, or other display device. Additionally, the information handling system 100 may include a visual customer interface 112, and a control device 116, such as an alpha numeric control device, a keyboard, a mouse, touchpad, fingerprint scanner, retinal scanner, face recognition device, voice recognition device, or gesture or touch screen input.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client use computer in a server-client customer network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, information handling system 100 includes one or more application programs or other code 124, such as a Basic Input/Output System and Firmware (BIOS/FW) code. BIOS/FW code functions to initialize information handling system 100 on power up, to launch an operating system, and to manage input and output interactions between the operating system and the other elements of information handling system 100. In a particular embodiment, BIOS/FW code reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in static memory 106, drive 114, in a ROM (not illustrated) associated with information handling system 100 or other memory. Other options include application programs and BIOS/FW code sourced from remote locations, for example via a hypervisor or other system, that may be associated with various devices of information handling system 100 partially in memory 104, storage system 106, drive unit 114 or in a storage system (not illustrated) associated with network interface device 118 or any combination thereof. Application programs or code 124, and BIOS/FW code can each be implemented as single programs, or as separate programs carrying out the various features as described herein. Application program interfaces (APIs) such as WinAPIs (e.g. Win32, Win32s, Win64, and WinCE), or an API adhering to a known open source specification may enable application programs 124 to interact or integrate operations with one another.

In an example of the present disclosure, instructions 124 may execute software for automatically inhibiting deployment of code instructions for execution where the code instructions fail to meet enhanced software auditing standards. The computer system 100 may operate as a stand-alone device or may be connected, such as via a network, to other computer systems or peripheral devices.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The disk drive unit 114, the CI/CD system 132, and the deployment static code analysis enforcement system 126 may include a computer-readable medium 122 such as a magnetic disk, or a solid-state disk in an example embodiment. The computer-readable medium of the memory, storage devices and the deployment static code analysis enforcement system 104, 106, 114, 132, and 126 may store one or more sets of instructions 124, such as software code corresponding to the present disclosure.

The disk drive unit 114, static memory 106, and computer readable medium 122 of the CI/CD system 132, or the deployment static code analysis enforcement system 126 also contain space for data storage. Code instructions for software applications may also be stored in part in the disk drive unit 114, static memory 106, or computer readable medium 122 of the CI/CD system 132, or deployment static code analysis enforcement system 126 in an embodiment. Further, the instructions 124 of the CI/CD system 132, or the deployment static code analysis enforcement system 126 may embody one or more of the methods or logic as described herein.

In a particular embodiment, the instructions, parameters, and profiles 124, the CI/CD system 132, and the deployment static code analysis enforcement system 126 may reside completely, or at least partially, within the main memory 104, the static memory 106, disk drive 114, and/or within the processor 102 during execution by the information handling system 100. Software applications may be stored in static memory 106, disk drive 114, the CI/CD system 132, and the deployment static code analysis enforcement system 126.

Network interface device 118 represents a NIC disposed within information handling system 100, on a main circuit board of the information handling system, integrated onto another component such as processor 102, in another suitable location, or a combination thereof. The network interface device 118 can include another information handling system, a data storage system, another network, a grid management system, another suitable resource, or a combination thereof, and may be enabled wired or wireless communication.

The CI/CD system 132, or deployment static code analysis enforcement system 126 may also contain computer readable medium 122. While the computer-readable medium 122 is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the CI/CD system 132, and the deployment static code analysis enforcement system 126. The CI/CD system 132, and deployment static code analysis enforcement system 126 may be operably connected to the bus 108. The deployment static code analysis enforcement system 126 in an embodiment may allow a user to provide human-readable code instructions for a customized software application, and translate these human-readable code instructions into machine-executable code instructions 138 for the customized software application 134. In an embodiment, the deployment static code enforcement system 126 may further operate to clean and audit the machine-executable code instructions 138 thus generated, as well as to terminate deployment of machine-executable code instructions 138 failing to pass a customized rule static code analysis described in greater detail herein. The deployment static code analysis enforcement system 126 in an embodiment in which the machine-executable code instructions 138 thus generated pass the customized rule static code analysis may instruct the continuous integration continuous deployment system 132 to deploy the machine-executable code instructions 138 for execution as the custom software application 134.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device or module can also include a combination of the foregoing examples of hardware or software. In an example embodiment, the CI/CD system 132, or the deployment static code analysis enforcement system 126 above and the several modules described in the present disclosure may be embodied as hardware, software, firmware or some combination of the same. Note that an information handling system can include an integrated circuit or a board-level product having portions thereof that can also be any combination of hardware and software. Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Figure 2:
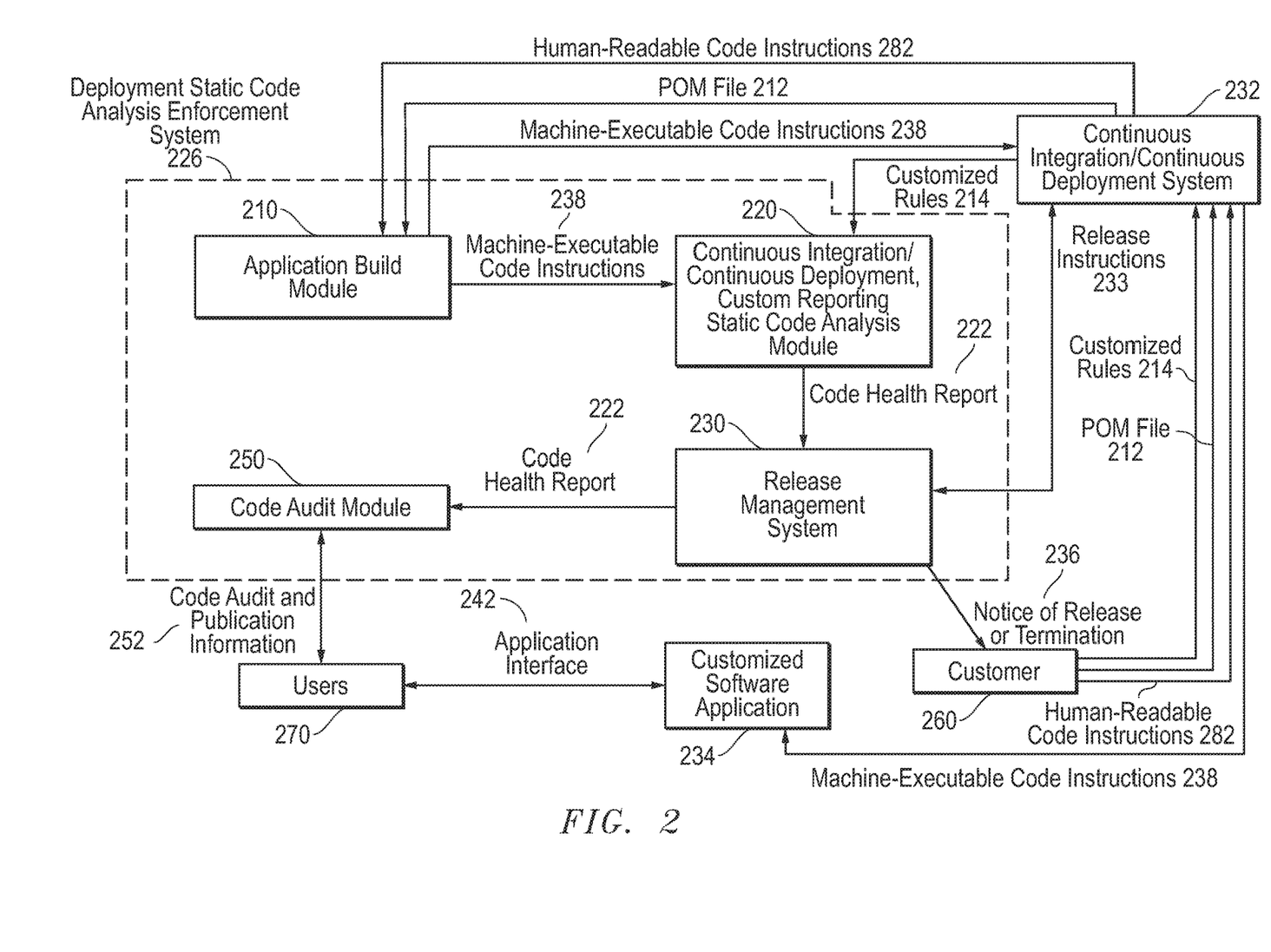
FIG. 2 is a graphical diagram illustrating a deployment static code analysis enforcement system according to an embodiment of the present disclosure.

FIG. 2 is a graphical diagram illustrating a deployment static code analysis enforcement system in communication with customers, release platforms, and third party application users according to an embodiment of the present disclosure. As described herein, the deployment static code analysis enforcement system 226 in an embodiment may automatically terminate deployment or release of customized software applications by the continuous integration/ continuous deployment system 232 (CI/CD system) that fail to pass a customized reporting static code analysis. The deployment static code analysis enforcement system 226 in an embodiment may include an application build module 210 that provides a system and method for on-demand creation of customized software application compiled code instructions (e.g., 238) in which the building of the customized software application compiled code instructions 238 occurs outside of a customer's computing network. The Dell Boomi® CI/CD system 232, includes an example of one such application build module 210.

The term "customer" referred to herein may include the customers of the application build module 210, the deployment static code analysis enforcement system 226, the CI/CD system 232, and creators or managers of the customized software application compiled code instructions 238. In contrast, the term "users" may describe users 270 accessing an executable version of the customized software application 234 via an application interface 242. For example, in one embodiment, the customized software application 234 may be the Dell Boomi® Atomsphere platform, and users 270 may include those who use the Dell Boomi® Atomsphere platform to create customized integration processes for deployment in locations remote from the Dell Boomi® Atomsphere platform. The "customer" 260 in such an embodiment may be an employee of Dell Boomi® Atomsphere working to update the machine-executable code instructions 238 underlying the Dell Boomi® Atomsphere platform. Such a customer 260 in an embodiment may use the continuous integration/continuous deployment system 232 to define the functionality of the machine-executable code instructions 238 by supplying the CI/CD system 232 with human-readable code instructions 282 and a POM file 212. The customer 260 may further define customized rules 214 to which the machine-executable code instructions 238 (generated based on the human-readable code instructions 282) must adhere before releasing the machine-executable code instructions 238 for access by the users 270, as described in greater detail herein.

In an example embodiment, the human-readable code instructions 282 may be written in Java® coding language. The POM file 212 in an embodiment may define several instructions for the creation of the machine-executable code instructions 238. Such instructions in an embodiment may include general information about the software module being compiled (e.g., name, version), and instructions to compile human-readable code instructions 282 into machine-executable code instructions 238. In an embodiment, such instructions may also include a definition of all library dependencies that are required to perform such a compilation, where to store resulting artifacts of the machine-executable code instructions 238, and instructions to perform static code analyses. The human-readable code instructions 282 and POM file 212 may be transmitted from the CI/CD system 232 in an embodiment to the build module 210 of the deployment static code analysis enforcement system 226 for compiling of the human-readable code instructions 282 into machine-executable code instructions 238.

An example build module 210 in an embodiment may allow a customer 260 to define a process for execution via the human-readable code instructions 282 and POM file 212, which the application build module 210 may then translate into a compiled code instructions 238 for a customized software application 234. For example, the deployment static code analysis enforcement system 226 described herein may include an application build module 210 operating CI/CD development modified open source code instructions drawn from the Apache® Maven™ Project to generate compiled code instructions 238 written in the Java® language. These CI/CD development modified open source code instructions, executed within the deployment static code analysis enforcement system 226 may be used to build, and clean the customized software application compiled code instructions 238 in embodiments described herein. In other words, the CI/CD development modified, Maven™-compliant code instructions may be executed by the application build module 210 at the service provider in order to generate the compiled code instructions 238 (e.g., in Java®) for the customized software application 234, and to transmit those compiled code instructions 238 to the CI/CD system 232 for deployment to a platform at which users may access the customized software application 234. For example, the compiled code instructions 238 in an embodiment may include compiled Java® bytecode that is executable by a Java Virtual Machine®, and is thus Java Virtual Machine executable code instructions. In other embodiments, the compiled code instructions 238 may include code instructions compiled based on human-readable code instructions written in coding languages other than Java®. These machine executable code instructions 238 may be further analyzed by one or more other modules of the deployment static code analysis enforcement system 226 (e.g., CI/CD custom reporting SCA module 220, or release management system 230) prior to deployment or release of the compiled, machine-executable code instructions 238 for the customized software application 234 for access by outside users 270 of the custom software application 234.

In an example embodiment, the human-readable code instructions 282 for the customized software application 234 may take the form of code instructions written in the human-readable Java® programming language that customizes standardized classes and interfaces with Java® objects. In such an embodiment, Java® classes may provide a generic blueprint, architecture, or template defining the allowable structure and function of Java® objects. These classes may include attributes and methods that may be applied to Java® objects instantiated by each class. Attributes may define a type of data, and may include a name and a value (e.g., as in a name/value pair). Classes may define attribute names, but not a value for a given attribute. In other words, a class may identify a type of dataset upon which an action may be taken, but may not identify a specific dataset having a known value.

A constructor in Java® may be used to assign an initial value to an attribute defined by a class. Such a constructor, when executed, may allocate a space in memory to the defined attribute (e.g., attribute name), and store an initial value associated with that attribute name. This process may be referred to herein as initialization of an attribute. Such an initialization must occur prior to beginning a thread that may execute code instructions to change the value of the attribute stored in memory. Any attempt to change a value associated with an attribute before the attribute and an initial value are stored in memory (e.g., prior to initialization) may essentially attempt to perform a process or action on a variable that does not appear to exist, returning a null error. Following initialization of an attribute, however, the class defining that attribute may instantiate a Java® object to change the value assigned to that attribute.

Java® objects may be created based on the class template from which the object is instantiated. Unlike classes, objects may operate on attributes having values, and inheriting the methods given in the instantiating class, may apply such methods to those values. In other words, a class may provide a template for performing an action on a dataset value, but the object may actually change the value associated with an object when a processor thread executes the object. Because each thread has the ability to change the value associated with an attribute defined in an object (or its instantiating class), only one processor thread should access an attribute at a time. Multiple threads changing the value simultaneously may result in unintended changes to the value, especially if the change instituted by one thread triggers a condition for changing the value in another thread.

An interface in Java® may define a set of such methods or actions that a subset of a class may perform. Each class may include multiple interfaces. For example, a "close" interface may define a set of methods that result in withdrawing access of a thread to an attribute, after that thread has changed the attribute's value. This may allow another thread to access the attribute, after the first thread has released the attribute. In such a way, simultaneous changes to the value of a single attribute by two separate threads (as described directly above) may be avoided. Classes may also include other processes that are not considered interfaces, but rather calls. For example, a lock call applied to a thread may cause that thread to execute an object, disallowing the thread to execute any other objects until the lock is released. Release of such a lock may be triggered by a wait call from another object, indicating to the thread that another object is waiting to be executed. In such a way, a thread may execute code instructions of each object serially, to change values associated with attributes, without overlapping execution of multiple objects simultaneously.

During the build process, the application build module 210 in an embodiment may use the received human-readable code instructions 282 and Project Object Model (POM) file 212, defining data object directory dependencies, to generate machine-executable code instructions 238 for the customized software application 234. The CI/CD development modified, Maven™-compliant code instructions, for example, or similar plug-ins, may be used by the application build module 210 in an embodiment to compile machine-executable code instructions 238 of a customized software application 234 in embodiments described herein. The application build module 210 in such an embodiment may transmit the machine-executable code instructions 238 to the CI/CD system 232, and to the CI/CD custom reporting static code analysis module 220, for generation of a code health report gauging the stability, scalability, and predictability of the machine-executable code instructions 238.

The CI/CD custom reporting static code analysis module 220 in such an embodiment may determine the number of times certain rules are violated within the machine-executable code instructions 238. Such rules may be preset by the customer via the CI/CD system 232. For example, if using CI/CD development modified, Maven™-compliant code instructions as the application build module 210, customized rules 214 may be set by the customer 260 using the enforcer plugin for Maven™, as executed by the CI/CD system 232 Such a customized rule 214, for example may be called "loops should not be infinite," and may operate to identify such infinite loops within the machine-executable code instructions 238 for the customized software application 234. In other embodiments, the CI/CD custom reporting static code analysis module 220 may perform such an analysis on the human-readable code instructions 282 and POM file 212, rather than the compiled, machine-executable code instructions 238. In such an embodiment, the CI/CD system 232 may transmit the human-readable code instructions 282 and POM file 212 directly to the CI/CD custom reporting static code analysis module 220 for such an analysis.

As described herein, the continuous integration/continuous deployment custom reporting static code analysis module 220 (CI/CD custom reporting SCA module) in an embodiment may apply several customized rules 214 during a customized static code analysis method. These customized rules 214 may be defined specifically to address concerns unique to or likely to be encountered during continuous updating and deployment of code corrections executed as part of the continuous integration/continuous deployment (CI/CD) software development strategy. Thus, the customized rules 214 and customized static code analysis performed by the CI/CD custom reporting SCA module 220 in an embodiment may supplement traditional or existing SCA tool capabilities to address issues specific to CI/CD. The CI/CD custom reporting SCA module 220 in an embodiment may generate a code health report 222 summarizing the number of times the machine-executable code instructions 238 (or human-readable code instructions 282 and POM file 212) violate one of the customized rules 214. Such a code health report 222 in an embodiment may be transmitted to the release management system 230 for determination as to whether the machine-executable code instructions 238 are sufficiently stable, scalable, and predictable to warrant release, allowing users 270 to access the customized software application 234 as updated by the machine executable code instructions 238. Apache® Maven™ open source code instructions may be said to be CI/CD development modified in embodiments described herein, so as to generate code health reports 222 that specifically address adherence of the machine-executable code instructions 238 to such customized rules 214 tailored for CI/CD processes.

A priority, or threat level for a rule may also be preset by a user, prior to generation of the code health report 222. Violation of some rules may result in fatal errors likely to result in repeated shutdown of the customized software application 234 upon its execution. Such a violation may be associated with a higher priority (e.g., 1) than other violations in an embodiment. In contrast, violation of other rules may not affect performance of the customized software application 234 in any way. For example, some rules require identification of a plug-in version called for execution within the machine-executable code instructions 238. Failure to provide such information may complicate auditing of the machine-executable code instructions 238, but may not in any way affect performance of the customized software application 234. Such a violation may be associated with a lower priority (e.g., 2 or 3) than a violation that could result in unintentional termination of the program. As described herein, each of the customized rules 214 applied by the CI/CD custom reporting SCA module 220 in an embodiment may be associated with the highest level priority describing critical code errors or fatal risks.

The category of violation may also be preset prior to generation of a code health report 222. Such a category may generally define the type of violation that has occurred. For example, a low-priority violation of a rule that requires identification of a plug-in version called for execution within the machine-executable code instructions 238 may be associated with a category such as "reporting," because the rule applies to reporting and auditing requirements. In contrast, a high-priority violation of a customized rule 214 that requires machine-executable code instructions 238 to avoid the use of infinite loops may be associated with a category "unpredictable," because it may not be known how the remainder of the machine-executable code instructions 238 called after the infinite loop is initiated will be executed, since the loop remains open. As described herein, each of the customized rules 214 applied by the CI/CD custom reporting SCA module 220 in an embodiment may be associated with one of three such categories, including "unpredictable," "unstable," or "non-scalable."

The code health report 222 generated by the CI/CD custom reporting SCA module 220 in an embodiment may list, per Java® class analyzed, the tool or plug-in executing when the rule violation was identified, the priority of violation, the line of the class in machine-executable code instructions 238 where the violation occurred, a category of violation, the name of the rule violated, and a message describing the purpose for the rule. The code health report 222 may also provide a summary describing the total number of violations per class, as well as the number of violations of each priority level per class, and a summary describing the number of rules violated, as well as identification of the rule violated and its priority for each category. For example, each code health report 222 may provide a summary of each customized rule 214 violated, the priority of such a violation, and the number of such violations for customized rules 214 falling within the category "unpredictable." The CI/CD custom reporting SCA module 220 in an embodiment may transmit such a code health report 222 to the release management system 230.

Additional plug-ins may also be created to collaborate with the Apache® Maven™ Plug-In to provide additional functionalities, in some embodiments. For example, the CI/CD custom reporting SCA module 220 in an embodiment may operate to apply the customized rules 214 to the analysis of the machine executable code instructions 238 or the human-readable code instructions 282 and POM file 212. As described above, setting customized rules 214, and associated priority and category may cause the CI/CD custom reporting SCA module 220 to generate code health report 222 summarizing customized reporting static code analysis not provided by existing SCA tools or Apache® Maven™ Such customized reporting static code analysis may be used to identify vulnerabilities in code instructions for customized software applications 234 that employ continuous integration/continuous deployment strategies (CI/CD), prior to their execution. Existing SCA tools may develop specific software metrics or perform a software audit based on rules that are not specific to continuous integration/continuous deployment issues. The CI/CD custom reporting SCA module 220 in an embodiment may perform customized reporting for auditing not provided by such existing SCA tools. For example, existing SCA tools may identify vulnerabilities in code instructions, such as, the use of poor programming language techniques (e.g., non-bounds-checking functions that could lead to a buffer overflow, pointer manipulation of buffers that may interfere with later bounds checking, circular input validation, cross-site scripting, and directory traversal), reliance on incorrect or expired object dependencies, or incorrect coding syntax.

The CI/CD custom reporting SCA module 220 in an embodiment may additionally identify vulnerabilities likely to affect an ability deliver minor changes to the machine-executable code instructions 238, used to maintain the customized software application 234, frequently and reliably. Such vulnerabilities may include, for example, executing a wait call while multiple lock calls are executed, executing a "thread.sleep" call during execution of a lock call, or including child class fields shadowing parent class fields. In another example, the CI/CD custom reporting SCA module 220 in an embodiment may additionally identify vulnerabilities such as executing a forced exit method, including infinite loops, or using "wait," "notify," and "notify all" calls on thread instances. In still another example embodiment, additional vulnerabilities may be identified within the machine-executable code instructions 238 of a customized software application 234 by the CI/CD custom reporting SCA module 220, including failure to close resources, such as connections, streams, files, and classes, calls to start a thread within a constructor, a parent class referencing its own child class during initialization, a call to an overrideable method within a constructor, or explicitly executing the garbage collector, rather than allowing the Java® Virtual Machine to do so. As described in greater detail below with respect to FIG. 4, each of these vulnerabilities may result in one or more of code unpredictability, code instability, or code non-scalability. Existing static code analysis tools do not analyze, record, and classify these types of code vulnerabilities in such a way.

The release management system 230 may determine whether to release the customized software machine-executable code instructions 238 for execution, as requested by a customer, based upon the received code health report 222. For example, the release management system 230 in an embodiment may determine the code health report 222 does not identify any critical code errors, either of the type identified within existing static code analysis tools, or of the type identified through the customized reporting static code analysis performed by the CI/CD custom reporting SCA module 220. The release management system 230 in such an embodiment may determine the machine-executable code instructions 238 for the customized software application 234 system are ready to be deployed without incurring significant risk of unpredictable, or unstable performance. In other embodiments, the release management system 230 may determine the machine-executable code instructions 238 for the customized software application system 234 are ready to be deployed if only specifically pre-identified critical code errors (e.g., critical code errors associated with a specific category or with a specific customized rule) are identified. Each customer may tailor the response of the release management system 230 to individual types of errors prior to initialization of the CI/CD custom reporting SCA module 220 in some embodiments. Upon the release management system 230 determining the machine-executable code instructions 238 for the customized software application 234 are ready to be deployed, the release management system 230 may issue an instruction 233 to the CI/CD system 232 to prepare machine-executable code instructions 238 for deployment.

In other cases, the release management system 230 may determine the machine-executable code instructions 238 for the customized software application 234 are not ready for deployment due to critical code errors identified within the received code health report 222. Identification of any critical code errors, either identified through existing static code analysis tools, or identified through the customized reporting static code analysis performed by the CI/CD custom reporting SCA module 220 in an embodiment may result in termination of release or deployment. Existing static code analysis tools and building tools such as Apache® Maven™ do not provide an ability to automatically terminate a release or deployment of machine-executable code instructions 238 for a customized software application 234 based on the results of static code analysis. The release management system 230, however, may automatically terminate the release or deployment of machine-executable code instructions 238 for a customized software application 234 based on the contents of the code health report 222 in an embodiment. In such a scenario, the release management system 230 may not transmit the instruction 233 to compile the machine-executable code instructions 238 to the custom software application 234 and may receive confirmation from the CI/CD system 232 that the machine-executable code instructions 238 have not been released. In such a scenario, the release management system 230 may also transmit a notice 236 to the customer 260 that requested the release that the customized software application 234 has not been released. As described herein, the "customer" 260 referred to herein may include the customers of the build tool, CI/CD system 232 (e.g., Boomi® employees updating the underlying code instructions for the Boomi® Atomsphere platform), and creators or managers of the customized software application 234. In contrast, "users" as referred to herein may describe users accessing the customized software application 234 via an interface 242.

In an embodiment in which the release management system 230 transmits release instructions 233 to the CI/CD system 232 pursuant to a passing code health report 222 for the custom software application machine-executable code instructions 238, the CI/CD system 232 may release the machine-executable code instructions 238 for deployment. For example, the CI/CD system 232 in an embodiment may release the machine-executable code instructions 282 to a release platform or storage location in memory. In some embodiments, the customized software application 234 may be stored at a release platform at which a Java Virtual Machine may execute the machine-executable code instructions 238. Such a release platform (shown in FIG. 2 as customized software application 234) may be located within the same local network as the CI/CD system 232, or may be located remotely from the CI/CD system 232 (e.g., within a customer's enterprise network). The machine-executable code instructions 238 may be transmitted to a server or memory location at which the customized software application 234 may be executed. Users 270 of the customized software application 234 in such an embodiment may then access the customized software application 234 via an application interface 242. For example, the customized software application 234 may be accessible in some embodiments via a web-based application interface 242.

The release management system 230 in an embodiment may also transmit the code health report 222 for storage at a code audit module 250. This may occur whether the release management system 230 releases the compiled, machine-executable code instructions 238 for the customized software application 234, or terminates the release process. Further, the release management system 230 in an embodiment may transmit such a code health report 222 for storage each time the machine-executable code instructions 238 for the customized software application 234 are edited, updated, and re-released, or re-versioned. Such stored code health reports 222 for multiple releases may be used to generate required documentation about the customized software application 234. This in-depth reporting ability may be useful in tracking each of the frequent, minor changes employed during the CI/CD process. For example, some users of the customized software application 234 may require heightened auditing describing the functionality, testing, and security of that application in comparison to other users. The United States Government, in particular, as well as its contractors and sub-contractors apply strict requirements regarding the stability, predictability, security, and scalability of any software applications it purchases and operates. The customized reporting static code analysis performed by the CI/CD custom reporting SCA module 220 in an embodiment, and the serial storage of reports 222 generated thereby may simplify reporting required to meet such auditing standards.

Users 270 of the customized software application 234 in an embodiment may include entities that access the customized software application 234 via an application interface 242. For example, an entity may purchase remote access to such a customized software application 234 via a network, or may purchase a version of the customized software application 234 for local storage within the entity's enterprise network. The U.S. Government, for example, or other entities requiring heightened auditing of such customized software applications may be users 270. Prior to purchasing the customized software application 234 in an embodiment, such users 270 may request code audit and publication information 252. The code audit module 250 may automatically compile the requested code audit and publication information 252, based on the code health reports 222 stored within the code audit module 250. In such a way, the deployment static code analysis enforcement system 226 in embodiments may perform customized reporting static code analysis of machine-executable code instructions 238 for customized software applications 234, automatically terminate release or deployment of an executable form of machine-executable code instructions 238 that include predefined critical code errors, and automatically generate code audit and publication information 252 based on the results of such a customized reporting static code analysis.

Figure 3:
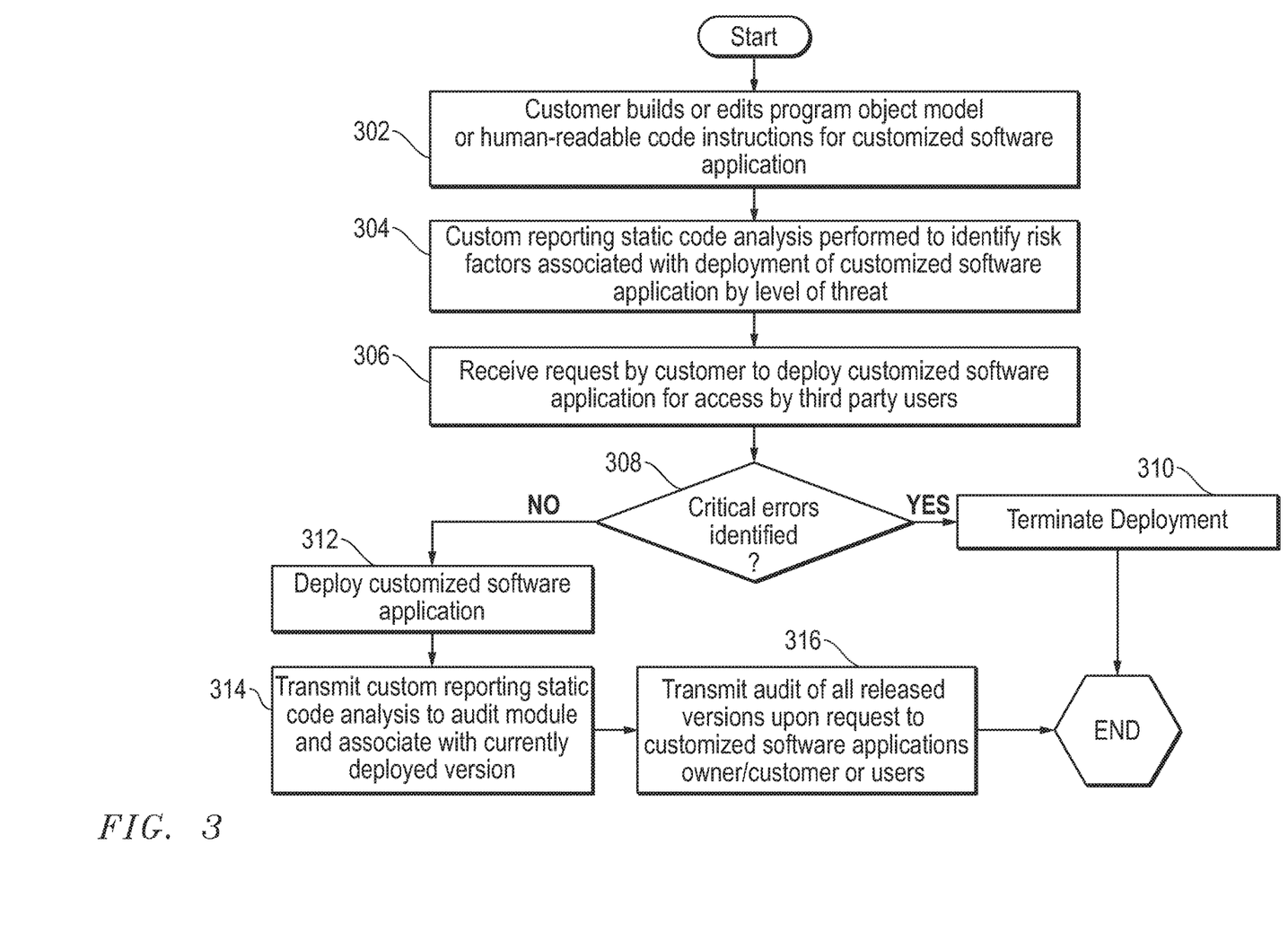
FIG. 3 is a flow diagram illustrating a method of responding to a customer request to release or deploy a custom-built software application according to an embodiment of the present disclosure.

FIG. 3 is a flow diagram illustrating a method of responding to a customer request to release or deploy a custom-built software application, based on a customized reporting static code analysis according to an embodiment of the present disclosure. As described herein, existing build and static code analysis tools do not allow for automatic termination of the release or deployment process. Without such automation, each deployment of a code revision for the custom-built software application must be reviewed for compliance with auditing standards through human intervention. Such necessary human intervention may inhibit the ability to provide frequent and reliable code revisions through a continuous integration/continuous deployment approach. The deployment static code analysis enforcement system in an embodiment provides such automation by performing more in-depth auditing or testing of the code instructions for the customized software application, and automatically terminating deployment or release if certain critical code errors are detected in such in-depth audit reports.

At block 302, the customer may build or edit a customized software application by supplying human-readable code instructions and a program object model. For example, in an embodiment described with respect to FIG. 2, a customer 260 may transmit human-readable code instructions 282 and a POM file 212 to the CI/CD system 232, which may transmit both 282 and 212 to the application build module 210. The application build module 210 may then compile the received human-readable code instructions 282 into machine-executable code instructions 238, based on dependencies defined within the POM file 212. A CI/CD development modified Apache® Maven™ build tool is an example of such an application build module 210 in some embodiments. In other embodiments, the application build module 210 may be any other build tool known currently in the art, or later developed, and may include versions of the Maven™ build tool that have been customized by the addition of other plug-ins.

The deployment static code analysis enforcement system in an embodiment may perform a custom reporting static code analysis to identify the risk factors associated with deployment of the customized software application by level of threat at block 304. For example, in an embodiment described with reference to FIG. 2, the continuous integration/continuous deployment custom reporting static code analysis module (CI/CD custom reporting SCA module) 220 in an embodiment may operate to identify vulnerabilities in machine-executable code instructions 238 for customized software application 234, prior to its release for execution. The CI/CD custom reporting SCA module 220 in an embodiment may receive customized rule 214 from the customer 260 via the CI/CD system 232 and generate a code health report 222 describing each customized rule 214 the machine executable code instructions 238 compiled by the application build module 210 violate. Applying such customized rules 214, and associated priority and category may cause the CI/CD custom reporting SCA module 220 to generate code health report 222 summarizing customized reporting static code analysis not provided by existing SCA tools or Apache® Maven™. As described herein, Apache® Maven™ open source code instructions may be said to be CI/CD development modified in embodiments, when the open source code instructions are modified to produce code health reports 222 that specifically address adherence of the machine-executable code instructions 238 to customized rules 214 tailored for CI/CD processes. Such customized reporting static code analysis may be used to identify vulnerabilities in machine-executable code instructions 238 for customized software application 234, prior to its compilation into machine-executable code instructions 238 and deployment of 238 for execution. The CI/CD custom reporting SCA module 220 may transmit the code health report 222 to the release management system 230.

The deployment static code analysis enforcement system 226 in an embodiment may apply customized rules 214 that are specific to concerns arising during the CI/CD process. For example, code errors that are likely to make the machine-executable code instructions for the customized software application 234 unpredictable, unstable, or non-scalable may be given the highest risk assessment, as these attributes pose a particularly high risk to frequently updated software applications. Specific examples of customized rules 214 intended to identify machine-executable code instructions that are potentially unpredictable may include a rule forbidding the use of forced exit methods within the machine-executable code instructions 238 of the customized software application 234. A rule forbidding execution of a "thread.sleep" call during execution of a lock call within the machine-executable code instructions 238 of the customized software application 234 may be an example of a customized rule 214 intended to identify human-readable code instructions that are potentially unstable. To identify human-readable code instructions that are potentially non-scalable, the customized rules 214 may include a rule barring a call to a start thread within a constructor of the machine-executable code instructions 238 for the customized software application 234.

Figure 4:
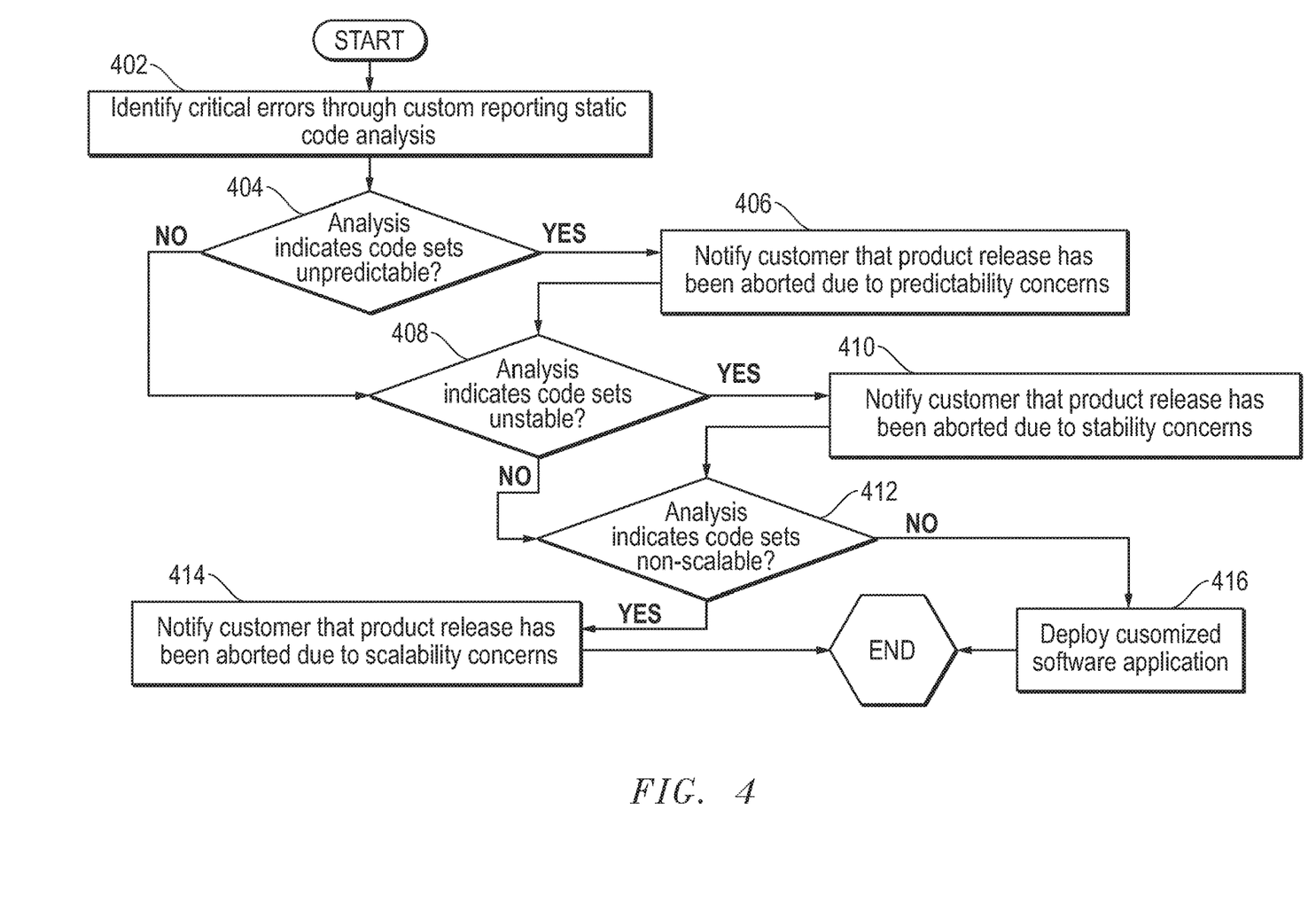
FIG. 4 is a flow diagram illustrating a method of identifying critical code errors through a customized reporting static code analysis according to an embodiment of the present disclosure.

Existing SCA tools may identify vulnerabilities in code instructions, such as, the use of poor programming language techniques (e.g., non-bounds-checking functions that could lead to a buffer overflow, pointer manipulation of buffers that may interfere with later bounds checking, circular input validation, cross-site scripting, and directory traversal), reliance on incorrect or expired object dependencies, or incorrect coding syntax. The CI/CD custom reporting SCA module 220 in an embodiment may additionally apply rules for identifying vulnerabilities specific to the continuous integration/continuous deployment method, as described in greater detail with respect to FIG. 4. The CI/CD custom reporting SCA module 220 in an embodiment may generate a code health report 222 in an embodiment, describing various details of all critical code errors identified through the customized reporting static code analysis performed by the CI/CD custom reporting SCA module 220 and application build module 210 in an embodiment. Such a code health report 222 in an embodiment may identify one or more of the code vulnerabilities discussed directly above, found within the analyzed code instructions for the customized software application 234. The code health report 222 in an embodiment may further include the type of vulnerability such errors entail, including threats to predictability, stability, or scalability. In other embodiments, in which none of the critical code errors discussed directly above and below with respect to FIG. 4 are identified within the code instructions 238 for the customized software application 234, the code health report 222 may include a list of other critical code errors typically identified within existing static code analysis tools. The CI/CD custom reporting SCA module 220 in an embodiment may transmit such a code health report 222 to the release management system 230.

At block 306, the deployment static code analysis enforcement system in an embodiment may receive a request by a customer to deploy the software application for access by third party users. For example, as described with reference to FIG. 2, the customer 260 may request release of the code instructions 238 for the customized software application 234 by the deployment static code analysis enforcement system 226. Such a request in an embodiment may trigger an analysis of the code health report 222 received at the release management system 230.

The deployment static code analysis enforcement system in an embodiment may determine at block 308 whether any critical code errors are identified within the code health report. For example, in an embodiment described with reference to FIG. 2, the release management system 230 in an embodiment may determine the code health report 222 does not contain any critical code errors, either of the type identified within existing static code analysis tools, or of the type identified through the customized reporting static code analysis performed by the CI/CD custom reporting SCA module 220. The release management system 230 in such an embodiment may determine the code instructions 238 for the customized software application 234 system are ready to be deployed without incurring significant risk of unpredictable, or unstable performance. If no critical code errors are identified within the code health report, the method may proceed to block 312, for deployment of machine-executable code instructions for the customized software application. If critical code errors are identified within the code health report, the method may proceed to block 310.

At block 310, the deployment static code analysis enforcement system, in an embodiment in which critical code errors are identified within the code health report at block 308, may automatically terminate deployment or block release of the machine-executable code instructions for the customized software application. For example, in an embodiment described with reference to FIG. 2, the release management system 230 may determine at block 308 that the machine-executable code instructions 238 for the customized software application 234 are not ready for deployment due to critical code errors identified within the received code health report 222. As described herein, identification of any critical code errors, either identified through existing static code analysis tools, or identified through the customized reporting static code analysis performed by the CI/CD custom reporting SCA module 220 in an embodiment may result in termination of release or deployment. Existing static code analysis tools and building tools such as Apache® Maven™ do not provide an ability to automatically terminate a release or deployment of code instructions for a customized software application based on the results of static code analysis. The release management system 230, however, may automatically terminate the release or block deployment of machine-executable code instructions 238 for a customized software application 234 based on the contents of the code health report 222 in an embodiment. The method may then end.

The deployment static code analysis enforcement system, in an embodiment in which static code analysis does not identify any critical code errors at block 308, may deploy the custom-built software application at block 312, as described. For example, in an embodiment described with reference to FIG. 2, upon the release management system 230 determining the code instructions 238 for the customized software application 234 are ready to be deployed, the release management system 230 may issue an instruction 233 to the continuous integration/continuous deployment system 232 (CI/CD system) to release the code instructions. The CI/CD system 232 in such an embodiment may transmit the machine-executable code instructions 238 to a release platform or server executing the customized software application 234, thus completing the deployment.

At block 314, the deployment static code analysis enforcement system in an embodiment may transmit the static code analysis code health report to the audit module and associate this report with the currently deployed version of the custom-built software application. For example, the release management system 230 in an embodiment may transmit the code health report 222 for storage at a code audit module 250. The release management system 230 in an embodiment may transmit such a code health report 222 for storage each time the code instructions 238 for the customized software application 234 are edited, updated, and re-released, or re-versioned. The code audit module 250 in such an embodiment may associate each stored health report 222 with an identification of the version or release of the customized software application 234.

The deployment static code analysis enforcement system in an embodiment may transmit an audit of all released versions upon request to the users of the customized software application at block 316. Stored code health reports 222 for multiple releases may be used to generate required documentation about the customized software application 234. Some users of the customized software application 234 (e.g., the U.S. Government) may require heightened auditing describing the functionality, testing, and security of that application in comparison to other users. The customized reporting static code analysis performed by the CI/CD custom reporting SCA module 220 in an embodiment, and the serial storage of reports 222 generated thereby may simplify reporting required to meet such auditing standards. Users 270 of the customized software application in an embodiment may include entities that access the customized software application 234 operating on the release platform via an application interface 242. Prior to purchasing the customized software application 234 in an embodiment, such users 270 may request code audit and publication information 252. The code audit module 250 may automatically compile the requested code audit and publication information 252, based on the code health reports 222 stored within the code audit module 250. In such a way, the deployment static code analysis enforcement system in embodiments may perform customized reporting static code analysis of machine-executable code instructions 238 for customized software application 234, automatically terminate release or deployment of such code instructions that include pre-defined critical code errors, and automatically generate code audit and publication information based on the results of such a customized reporting static code analysis. The method may then end.

FIG. 4 is a flow diagram illustrating a method of identifying critical code errors affecting predictability, stability, and scalability of a custom-built software application through a customized reporting static code analysis according to an embodiment of the present disclosure. As described herein, existing SCA tools may identify some vulnerabilities in code instructions, but the deployment static code analysis enforcement system in an embodiment may identify additional vulnerabilities through a customized reporting static code analysis, as described in greater detail below. Such additional vulnerabilities may specifically address concerns unique to or likely to be encountered during continuous updating and deployment of code corrections executed as part of the continuous integration/continuous deployment (CI/CD) software development strategy in some embodiments. Thus, the customized static code analysis performed by the deployment static code analysis enforcement system in an embodiment may supplement traditional or existing SCA tool capabilities to address issues specific to CI/CD.

At block 402, the deployment static code enforcement system in an embodiment may identify critical code errors through a customized reporting static code analysis process. For example, in an embodiment described with reference to FIG. 2, the continuous integration/continuous deployment custom reporting static code analysis module 220 (CI/CD custom reporting SCA module) in an embodiment may operate to identify vulnerabilities in machine-executable code instructions 238 for customized software application 234, prior to its deployment for execution. Existing SCA tools may perform a software audit using one or more Maven™ static code analysis plug-ins. The CI/CD custom reporting SCA module 220 in an embodiment may perform customized reporting for auditing described in greater detail below, that is not provided by such existing SCA tools.

The deployment static code enforcement system may determine at block 404 whether the CI/CD custom reporting static code analysis indicates machine-executable code instructions for the customized software application are unpredictable. For example, the CI/CD custom reporting SCA module 220 in an embodiment may identify child class field names shadowing or mirroring parent class field names. Using a variable with the same name within a class hierarchy may lead to developer mistakes and unexpected behavior of the software application upon execution. Similarly, class names shadowing interface or superclass names may also result in developer mistakes and unexpected behavior.

In another example, the CI/CD custom reporting SCA module 220 in an embodiment may identify vulnerabilities such as executing a forced exit method, such as "system.exit (int status)" or "Runtime.getRuntime( ).exit(int status)." Forcing an exit method in such a way may shut down the entire Java® virtual machine prior to finalization of a process. Such methods should be used with great care, and only when the intent is to stop the entire Java® process. For example, these forced exit methods should not be used when an application is running in a Java® Platform Second Enterprise Edition (J2EE) container.

Additional vulnerabilities, including infinite loops, may be identified within the code instructions of a customized software application by the CI/CD custom reporting SCA module 220 in yet another example, if each programming loop within an object fails to include an end condition. Failure to provide such an end condition or a break in a loop may cause all processes to freeze, requiring the customer to force a shutdown of the program.

In still another example, CI/CD custom reporting SCA module 220 in an embodiment may additionally identify vulnerabilities such as the use of "wait," "notify," and "notify all" calls on thread instances. The Java® Virtual Machine may rely on these "wait," "notify," and "notify all" calls to change the state of the thread (e.g., from "blocked" to "waiting"). Executing of these calls by both the customized software application and the Java® Virtual Machine may corrupt performance of the Java® Virtual Machine, sometimes in unanticipated ways (e.g., unintentionally shifting the thread from "blocked" to "waiting" or vice versa). Further, it may be unclear which conditions may trigger a "wait" call, and if multiple wait calls are made (e.g., by both the Java® Virtual Machine and the customized software application), it may be unclear which conditions trigger which wait process.

Additional vulnerabilities, including a parent class referencing its own child class during initialization, may be identified within the code instructions of a customized software application by the CI/CD custom reporting SCA module 220 in yet another example. A constructor may initialize parent attributes first, then child attributes. If a parent class references a child attribute during its own initialization, this results in a reference to an attribute that has not yet been initialized. Essentially, such a process may result in pointing to an attribute not yet stored to memory, which may result in deadlock, or unpredictable behavior of the customized software application.

The CI/CD custom reporting SCA module 220 in another example embodiment may additionally identify vulnerabilities such as a call to an overrideable method within a constructor. A child class may override such an overrideable method in Java®. If the child class issues such an override command, when the constructor for the child class attempts to initialize attributes defined by the child class, it will first call the parent class. The parent class constructor will then execute, but will not execute the method overridden by the child class. This may result in incomplete initialization of each of the attributes defined by the parent and child classes. When the child class then instantiating an object, it will attempt to execute a process that may result in pointing to an attribute not yet stored to memory, which may result in deadlock, or unpredictable behavior of the customized software application.

In still another example embodiment, additional vulnerabilities may be identified within the code instructions of a customized software application by the CI/CD custom reporting SCA module 220, including explicitly executing the garbage collector, rather than allowing the Java® Virtual Machine to do so. The garbage collector in Java® may be explicitly called by the commands "System.gc( ) or Runtime.getRuntime( ).gc( ). However, the response a Java® Virtual Machine executing code instructions will have to such a call is not standardized across Java® Virtual Machine vendors. In some circumstances, the Java® Virtual Machine may freeze the entire application, and in other circumstances, for example, the instruction may be ignored completely.

If the static code analysis indicates code instructions for the customized software application are unpredictable, the method may proceed to block 406 to notify the customer. If the static code analysis indicates code instructions for the customized software application are not unpredictable, the method may proceed to block 408 for analysis of the stability of the code instructions.

At block 406, the deployment static code enforcement system in an embodiment in which the static code analysis indicates code instructions are unpredictable may notify the customer that the product release has been aborted due to predictability concerns. For example, in an embodiment in which the CI/CD custom reporting SCA module 220 has determined any of the critical code errors described above with reference to block 404 have been identified, the CI/CD custom reporting SCA module 220 may generate, within the code health report 222, a notification of critical error, indicating the machine-executable code instructions 238 are unpredictable. The release management system 230 in such an embodiment may receive the code health report 222, and upon receiving a request to release the custom-built software application 234, reference the report 222 to determine suitability of release. The release management system 230 in such an embodiment may identify the critical error, and that it is classified as "unpredictable," by referencing the code health report 222. In such an embodiment, the release management system 230 may then automatically terminate the release, and may transmit a notification 236 to the customer 260 that the release has been terminated due to predictability concerns. The method may then proceed to block 408 to determine whether other critical code errors relating to stability have also been identified through the customized reporting static code analysis.

The deployment static code enforcement system may determine at block 408 whether the static code analysis indicates code instructions for the customized software application are unstable. For example, the CI/CD custom reporting SCA module 220 in an embodiment may identify additional vulnerabilities such as executing a wait call while multiple lock calls are executed. When multiple locks are held simultaneously, a wait call will release only one of them. The remaining multiple locks may be held until some other thread requests a lock on the awaited object, but if no unrelated code tries to lock on that object, all other threads will be locked out from accessing that object. Such code instructions may thus result in multi-threading deadlock.

In another example, the CI/CD custom reporting SCA module 220 in an embodiment may additionally identify vulnerabilities such as executing a "thread.sleep" call during execution of a lock call. When a thread is locked, a sleep call may cause that thread to freeze, such that it is unable to receive a wait call from another object. This may cause the thread locking the object to fail to release the object, and other threads may be incapable of accessing that object. Such code instructions may thus result in multi-threading deadlock, or scalability issues.

In still another example, the CI/CD custom reporting SCA module 220 in an embodiment may additionally identify vulnerabilities such as the use of "wait," "notify," and "notify all" calls on thread instances. The Java® Virtual Machine may rely on these "wait," "notify," and "notify all" calls to change the state of the thread (e.g., from "blocked" to "waiting"). Executing of these calls by both the customized software application and the Java® Virtual Machine may corrupt performance of the Java® Virtual Machine, sometimes in unanticipated ways (e.g., unintentionally shifting the thread from "blocked" to "waiting" or vice versa). Further, it may be unclear which conditions may trigger a "wait" call, and if multiple wait calls are made (e.g., by both the Java® Virtual Machine and the customized software application), it may be unclear which conditions trigger which wait process.

If the static code analysis indicates machine-executable code instructions for the customized software application are unstable, the method may proceed to block 410 to notify the customer. If the static code analysis indicates machine-executable code instructions for the customized software application are not unpredictable, the method may proceed to block 412 for analysis of the scalability of the machine-executable code instructions.

At block 410, the deployment static code enforcement system in an embodiment in which the static code analysis indicates code instructions are unstable may notify the customer that the product release has been aborted due to stability concerns. For example, in an embodiment in which the CI/CD custom reporting SCA module 220 has determined any of the critical code errors described above with reference to block 408 have been identified, the CI/CD custom reporting SCA module 220 may generate, within the code health report 222, a notification of critical error, indicating the code instructions are unstable. The release management system 230 in such an embodiment may receive the code health report 222, and upon receiving a request to release the custom-built software application 234, reference the report 222 to determine suitability of release. The release management system 230 in such an embodiment may identify the critical error, and that it is classified as "unstable," by referencing the code health report 222. In such an embodiment, the release management system 230 may then automatically terminate the release, and may transmit a notification 236 to the customer 260 that the release has been terminated due to stability concerns. The method may then proceed to block 412 to determine whether other critical code errors relating to scalability have also been identified through the customized reporting static code analysis.

The deployment static code enforcement system may determine at block 412 whether the static code analysis indicates machine-executable code instructions for the customized software application are non-scalable. For example, the CI/CD custom reporting SCA module 220 in an embodiment may identify additional vulnerabilities within the machine-executable code instructions such as executing a "thread.sleep" call during execution of a lock call. When a thread is locked, a sleep call may cause that thread to freeze, such that it is unable to receive a wait call from another object. This may cause the thread locking the object to fail to release the object, and other threads may be incapable of accessing that object. Such machine-executable code instructions may thus result in multi-threading deadlock, or scalability issues, because increasing the number of threads executing commands pursuant to such machine-executable code instructions may increase the number of threads that become deadlocked.

In still another example embodiment, additional vulnerabilities may be identified within the machine-executable code instructions of a customized software application by the CI/CD custom reporting SCA module 220, including failure to close resources, such as connections, streams, files, and classes. Failure to close resources may result in a resource leak, which may affect performance during execution of the customized software application. The CI/CD custom reporting SCA module 220 in an embodiment may identify when resources that are capable of implementing the closeable interface or autocloseable interface have failed to do so. Additionally, the CI/CD custom reporting SCA module 220 in an embodiment may identify when such an invocation of the closeable interface or autocloseable interface is located in a block other than the final block for an object. Invoking such a call prior to the final block may cause an exception and the call to close the resource may not be executed. Failure to close the resource may result in an ongoing drain on available memory. Such a drain involving only a few resources, or short-acting processes may not cause any significant problems, but as the number of such draining resources or processes increases (as when an application increases in scale), such memory drains may cause significant problems.

The CI/CD custom reporting SCA module 220 in another example embodiment may additionally identify vulnerabilities such as a call to start a thread within a constructor. As described herein, a constructor in Java® may be used to initialize an attribute, or assign an initial value to an attribute defined by a class. Such an initialization must occur prior to beginning a thread that may execute code instructions to change the value of the attribute stored in memory. A thread may be started within a constructor for a single class with no children, if the command to start the thread occurs after the constructor has assigned the initial value to the attribute and stored it within memory. At that point, any attempt to instantiate a Java® object to change the value may result in changing the initial value stored prior to starting the thread. However, if this class is scaled to include a child class, the order of processes may result in initialization of a subset of attributes defined in the parent class, start of the thread, then an attempt by the child to initialize another subset of attributes not initialized prior to the start of the thread. This may essentially result in pointing to a location in memory that does not yet exist, which is a fatal error. Thus, starting a thread within a constructor may make a class unscalable, or unable to successfully execute child classes.

If the static code analysis indicates code instructions for the customized software application are unscalable, the method may proceed to block 414 to notify the customer. If the static code analysis indicates code instructions for the customized software application are scalable, the code instructions may not present a significant risk relating to predictability, stability, or scalability, and the method may proceed to block 414 for deployment of the machine-executable code instructions.

At block 414, the deployment static code enforcement system in an embodiment in which the static code analysis indicates code instructions are non-scalable may notify the customer that the product release has been aborted due to scalable concerns. For example, in an embodiment in which the CI/CD custom reporting SCA module 220 has determined any of the critical code errors described above with reference to block 412 have been identified, the CI/CD custom reporting SCA module 220 may generate, within the code health report 222, a notification of critical error, indicating the code instructions are non-scalable. The release management system 230 in such an embodiment may receive the code health report 222, and upon receiving a request to release the custom-built software application, reference the report 222 to determine suitability of release. The release management system 230 in such an embodiment may identify the critical error, and that it is classified as "non-scalable," by referencing the code health report 222. In such an embodiment, the release management system 230 may then automatically terminate the release, and may transmit a notification 236 to the customer 260 that the release has been terminated due to scalability concerns. The method may then end.

The blocks of the flow diagrams 3-4 discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram. Further, those of skill will understand that additional blocks or steps, or alternative blocks or steps may occur within the flow diagrams discussed for the algorithms above.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of enforcing a deployment static code analysis comprising:
    receiving, via a processor, human-readable code instructions for a customized software application;
    compiling, via the processor, the human-readable code instructions into machine-executable code instructions;
    performing, via the processor, a customized reporting static code analysis of the machine-executable code instructions to identify a critical code error resulting from violation of a pre-set customized rule associated with a pre-defined terminal risk;
    receiving an instruction, via a network interface device, from a customer, to release, for execution, the machine-executable code instructions;
    automatically terminating release of the machine-executable code instructions via the processor;
    transmitting a notification to the customer identifying the pre-defined terminal risk, via the network interface device.

2. The method of claim 1, wherein the customized software application is configured using a program object model (POM), and the human-readable code instructions are compiled into machine-executable code instructions based on the POM.

3. The method of claim 1, wherein the pre-defined terminal risk is unpredictability of the machine-executable code instructions.

4. The method of claim 2, wherein the pre-set customized rule bars the use of child class field names mirroring parent class field names within the machine-executable code instructions.

5. The method of claim 2, wherein the pre-set customized rule bars the use of a forced exit method within the machine-executable code instructions.

6. The method of claim 2, wherein the pre-set customized rule bars the use of infinite loops within the machine-executable code instructions.

7. The method of claim 2, wherein the pre-set customized rule bars the use of a wait call, a notify call, or a notify all call on a thread instance within the machine-executable code instructions.

8. The method of claim 2, wherein the pre-set customized rule bars a parent class within the machine-executable code instructions referencing a child class of the parent class during an initialization of a Java attribute defined by the parent class.

9. An information handling system operating a deployment static code analysis enforcement system comprising:
    a processor receiving human-readable code instructions for a customized software application;
    the processor compiling the human-readable code instructions into machine-executable code instructions;
    the processor performing a customized reporting static code analysis of the machine-executable code instructions to identify a critical code error resulting from violation of a pre-set customized rule associated with a pre-defined terminal risk;
    a network interface device receiving an instruction from a customer to release, for execution, the machine-executable code instructions;
    the processor automatically terminating release of the machine-executable code instructions;
    the network interface device transmitting a notification to the customer identifying the pre-defined terminal risk.

10. The information handling system of claim 9, wherein the pre-defined terminal risk is instability of the machine-executable code instructions.

11. The information handling system of claim 10, wherein the pre-set customized rule bars executing a wait call while a plurality of lock calls are executed within the machine-executable code instructions.

12. The information handling system of claim 10, wherein the pre-set customized rule bars executing a thread.sleep call during execution of a lock call within the machine-executable code instructions.

13. The information handling system of claim 10, wherein the pre-set customized rule bars the use of a wait call, a notify call, or a notify all call on a thread instance within the machine-executable code instructions.

14. An information handling system operating a deployment static code analysis enforcement system comprising:
    a processor receiving human-readable code instructions for a customized software application and a program object model (POM);
    the processor compiling the human-readable code instructions into machine-executable code instructions, based on the POM;
    the processor performing a customized reporting static code analysis of the human-readable code instructions to identify a critical code error resulting from violation of a pre-set customized rule associated with a pre-defined terminal risk;
    wherein the pre-defined terminal risk is non-scalability of the machine-executable code instructions;

a network interface device receiving an instruction from a customer to release, for execution, the machine-executable code instructions;

the processor automatically terminating deployment of the machine-executable code instructions;

the network interface device transmitting a notification to the customer identifying the pre-defined terminal risk.

15. The information handling system of claim 14, wherein the pre-set customized rule bars executing a thread.sleep call during execution of a lock call within the machine-executable code instructions.

16. The information handling system of claim 14, wherein the pre-set customized rule bars failure to close a connection, stream, file, or class within the machine-executable code instructions.

17. The information handling system of claim 14, wherein the pre-set customized rule bars execution of a call to start a thread within a constructor for the machine-executable code instructions.

18. The information handling system of claim 14 further comprising:

the network interface device transmitting a notification to the customer identifying a class of the machine-executable code instructions at which the critical code error is identified.

19. The information handling system of claim 18 further comprising:

the network interface device transmitting a notification to the customer identifying a line of the class of the machine-executable code instructions at which the critical code error is identified.

20. The information handling system of claim 14 further comprising:

the network interface device transmitting a notification to the customer identifying a Java software tool executing the critical code error.

* * * * *